United States Patent [19]
Na

[11] Patent Number: 6,147,700
[45] Date of Patent: Nov. 14, 2000

[54] NOISE-HAVING REVERSE SIGNAL ISOLATOR AND REVERSE SIGNAL COMBINING DEVICE IN SERVICE SYSTEM USING CATV NETWORK

[75] Inventor: Jeong-Sik Na, Seoul, Rep. of Korea

[73] Assignee: SamSung Electronics Co., Ltd., Suwon, Rep. of Korea

[21] Appl. No.: 09/384,230

[22] Filed: Aug. 27, 1999

[30] Foreign Application Priority Data

Aug. 28, 1998 [KR] Rep. of Korea ...................... 98-35119

[51] Int. Cl.[7] .................................................. H04N 7/10
[52] U.S. Cl. ................................................................ 348/12
[58] Field of Search ................................ 348/12, 13, 192, 348/193; 455/5.1, 67.3; 333/101

[56] References Cited

U.S. PATENT DOCUMENTS

| | | |
|---|---|---|
| 4,367,557 | 1/1983 | Stern et al. . |
| 4,810,898 | 3/1989 | Rocci et al. ............................. 307/115 |
| 4,982,440 | 1/1991 | Dufresne et al. ............................ 455/4 |
| 5,790,523 | 8/1998 | Ritchie, Jr. et al. . |
| 5,826,167 | 10/1998 | Jelinek et al. . |
| 5,859,661 | 1/1999 | Dzuban ..................................... 348/12 |
| 5,881,363 | 3/1999 | Ghosh et al. ............................ 455/5.1 |
| 5,893,024 | 4/1999 | Sanders et al. ......................... 455/5.1 |
| 5,915,205 | 6/1999 | Chen ........................................ 455/5.1 |
| 5,937,330 | 8/1999 | Vince et al. .............................. 455/5.1 |

*Primary Examiner*—Nathan Flynn
*Assistant Examiner*—Ngoc Vu
*Attorney, Agent, or Firm*—Robert E. Bushnell, Esq.

[57] ABSTRACT

A noise-having reverse signal isolator and a reverse signal combining device in a service system using a CATV network, for preventing noise introduced in a reverse signal from affecting other reverse signals. The reverse signal combining device includes a plurality of noise isolators and a combiner. The noise isolators determine whether noise is introduced into a plurality of reverse signals, isolate a corresponding reverse signal in the presence of noise, and output the reverse signals in the absence of noise. The combiner combines the outputs of the plurality of the noise isolators.

18 Claims, 3 Drawing Sheets

NOISE-HAVING REVERSE SIGNAL ISOLATOR AND REVERSE SIGNAL COMBINING DEVICE IN SERVICE SYSTEM USING CATV NETWORK

CLAIM OF PRIORITY

This application makes reference to, incorporates the same herein, and claims all benefits accruing under 35 U.S.C. §119 from an application Entitled Noise-Having Reverse Signal Isolator And Reverse Signal Combining Device In Service System Using CATV Network earlier filed in the Korean Industrial Property Office on Aug. 28, 1998, and there duly assigned Ser. No. 98-35119.

BACKGROUND OF THE INVENTION

1. Field of the Invention

The present invention relates to a service system using a cable television (CATV) network, and more particularly, to a reverse signal transmitting device.

2. Description of the Related Art

A variety of additional services have recently been provided over a CATV network in addition to multi-channel broadcasting. For this purpose, a plurality of subscribers are grouped into a cell and a predetermined number of cells are again grouped into a zone in a system using a HFC (Hybrid Fiber and Coaxial) network as a CATV network.

Signal transmissions for a service over a CATV network are largely divided into forward transmission and reverse transmission. The forward transmission refers to transmission of a signal (forward signal) for services from a service provider to a subscriber, and the reverse transmission indicates transmission of a signal (reverse signal) for requesting for services from a subscriber to a service provider. See, for example, U.S. Pat. No. 4,367,557 to Joseph L. Stern et al. entitled Wired Broadcasting Systems; U.S. Pat. No. 5,790,523 to John H. Ritchie, Jr. et al. entitled testing Facility For A Broadband Communications System; and U.S. Pat. No. 5,826,167 to Catherine W. Jelinek et al. entitled Bi-Directional Cable Television System Including A UHF Filter, incorporated by reference herein.

Except for distortion of a forward signal during transmission, there is no other great difficulty in the forward transmission since a single sender, that is, a single service provider distributes the forward signal to a plurality of subscribers. On the other hand, the reverse transmission may make it impossible to recover an original reverse signal since reverse signals from a plurality of subscribers are combined in the course of heading for one destination, namely, the service provider in view of characteristics of the RF (Radio Frequency) signals. Therefore, a reverse signal is transmitted at a different frequency assigned to each subscriber or in time division under the control of the service provider, for example, in a polling scheme. In particular, when a plurality of subscribers use different frequencies in sending their reverse signals to the service provider, noise introduced into a reverse signal may adversely affect other reverse signals.

This will be described referring to FIG. 1 illustrating connections between a service provider and subscribers in a conventional service system using a CATV network. In FIG. 1, first to Nth cells C1 to CN each accommodate a plurality of subscribers and belong to zone A. The subscribers within zone A are connected to the service provider through a head end (or headend) 100. Reverse signals from the subscribers within an identical cell and then an identical zone are combined prior to transmission to the service provider through the head end 100. The service provider transmits a forward signal to the subscribers through the head end 100.

This conventional service system has a distinctive shortcoming that if noise is introduced into a reverse signal from a subscriber within the first cell C1, the noise influences reverse signals from other subscribers during combination of the reverse signals. As a result, all the combined reverse signals cannot be recovered.

SUMMARY OF THE INVENTION

An object of the present invention is to provide a noise-having reverse signal isolator and a reverse signal combining device in a service system using a CATV network, which can prevent noise introduced in a reverse signal from affecting other reverse signals.

To achieve the above object, there is provided a reverse signal combining device in a service system using a CATV network. The reverse signal combining device includes a plurality of noise isolators and a combiner. The noise isolators determine whether noise is introduced into a plurality of reverse signals, isolate a corresponding reverse signal in the presence of noise, and output the reverse signals in the absence of noise. The combiner combines the outputs of the plurality of the noise isolators.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

The present invention provides a device for combining a plurality of reverse signals in a CATV-using service system, in which noise possibly introduced in a reverse signal is detected and isolated from other reverse signals so that they can reach a service provider in their integrity. Though the present invention is applicable to a device for combining reverse signals from a plurality of subscribers or from a plurality of cells, it is to be appreciated that the following description is confined to the latter case by way of example.

Figure 1:
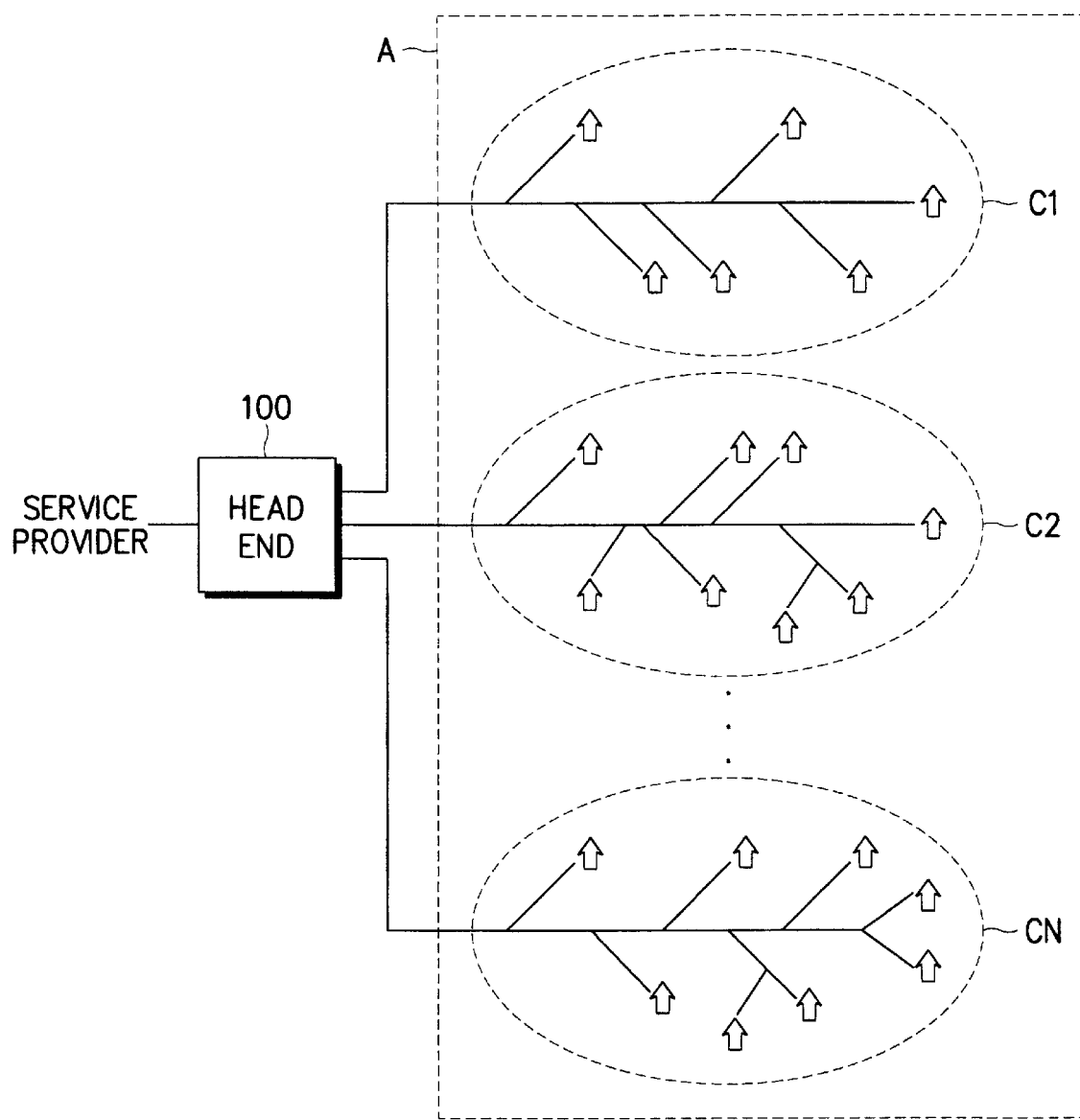
FIG. 1 is a view illustratively depicting connections between a service provider and subscribers in a service system using a CATV network.
Figure 2:
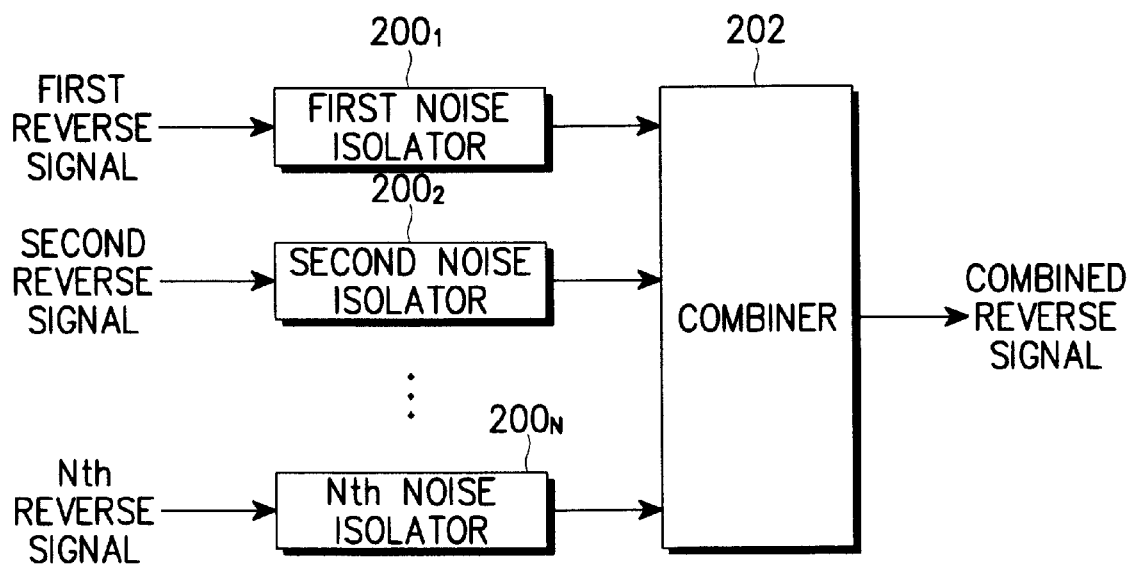
FIG. 2 is a block diagram of a reverse signal combining device.

FIG. 2 is a block diagram of a device for combining signals from a plurality of cells in a CATV-using service system. Referring to FIG. 2, first to Nth reverse signals from a plurality of cells are applied to first to Nth noise isolators $200_1$ to $200_N$. The noise isolators $200_1$ to $200_N$ determine whether noise is introduced into their respective reverse signals. In the absence of noise, they feed the input reverse signals to a combiner 202, and in the presence of noise, a noise-having reverse signal is not fed to the combiner 202. The combiner 202 combines the reverse signals received from the first to Nth noise isolators $200_1$ to $200_N$ into one reverse signal. The resulting combined reverse signal is provided to the service provider through the head end 100 as shown in FIG. 1.

The first to Nth noise isolators $200_1$ to $200_N$ are identical in configuration and operation. Thus, the first to Nth noise isolators $200_1$ to $200_N$ will described by describing, in detail, the configuration and operation of the first noise isolator $200_1$.

Figure 3:
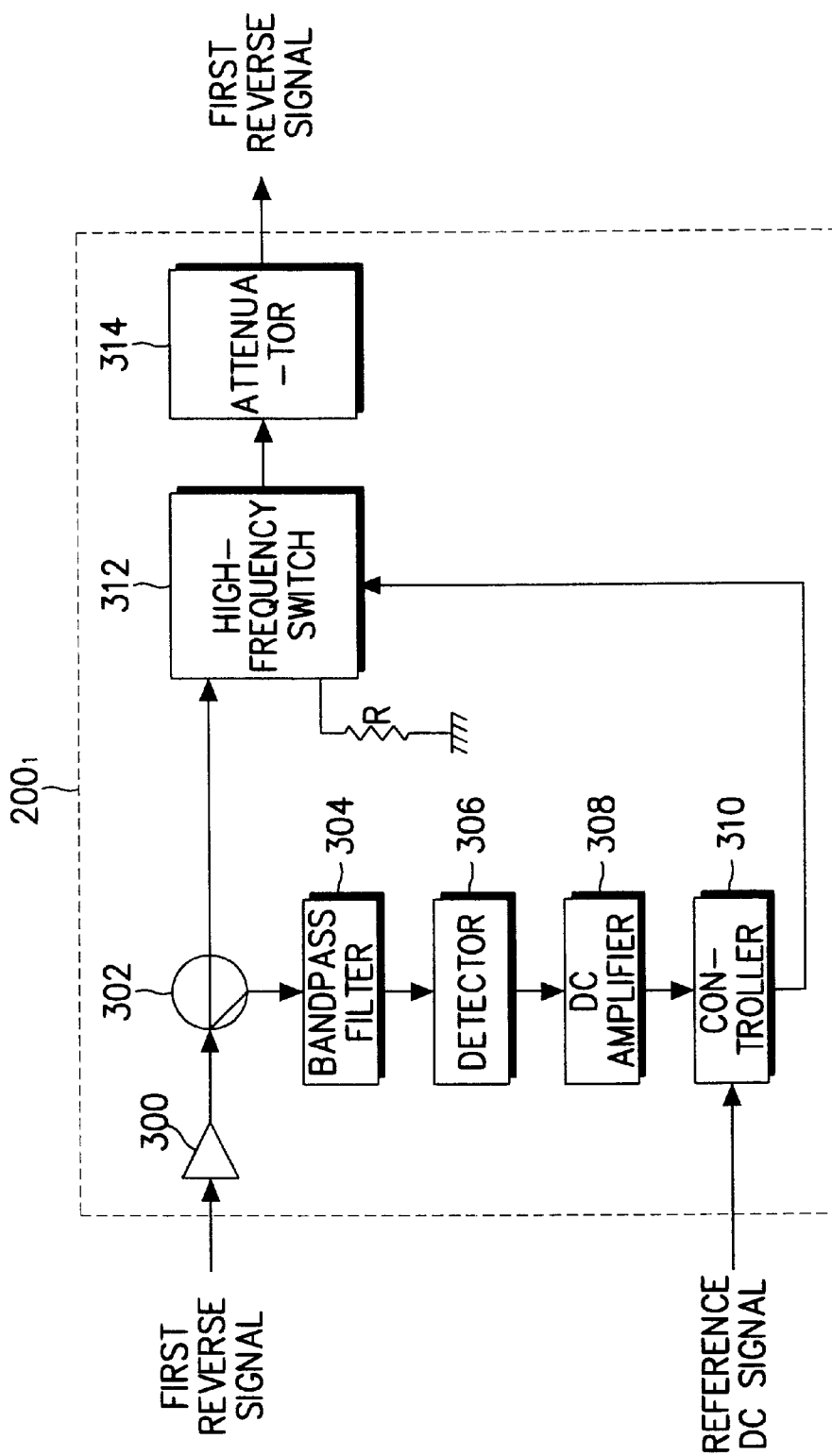
FIG. 3 is a block diagram of a noise isolator shown in FIG. 2.

FIG. 3 is a block diagram of the first noise isolator $200_1$. Referring to FIG. 3, an amplifier 300 amplifies the input first reverse signal and a divider 302 divides the amplified signal received from the amplifier 300 into a first signal and a second signal. A bandpass filter 304, which is set to pass only a signal in a noise-susceptible band (5–15 MHz), passes the signal in the preset band from the first signal received from the divider 302. A detector 306 rectifies the output of the bandpass filter 304 and outputs a very weak rectified DC (Direct Current) signal. A DC amplifier 308 amplifies the DC signal, and a controller 310 compares the output of the DC amplifier 308 with an input reference DC signal. Here, the reference DC signal is controlled depending on the status of the input reverse signal. If the output of the DC amplifier 308 is smaller in strength than the reference DC signal, the controller 310 considers that no noise is introduced. Otherwise, the controller 310 considers that noise exists.

A high-frequency switch 312 has a first input terminal which receives the second signal from the divider 302 and a second input terminal connected to one end of a matching resistor R having the other end grounded. 75 Ω may be used in the matching resistor R. The high-frequency switch 312 selectively connects the first and second input terminals to its output terminal under the control of the controller 310. A relay can be a substitute for the high-frequency switch 312.

In the absence of noise, the controller 310 controls the high-frequency switch 312 to connect the first input terminal to the output terminal. In the presence of noise, the controller 310 controls the high-frequency switch 312 to connect the second input terminal to the output terminal. An attenuator 314 controls the level of a signal received from the high-frequency switch 312 according to user manipulation. Here, the operator may control the attenuator 314 in such a way that the levels of the reverse signals received from all the cells are made identical.

Now, there will be given a description of the operation of the noise isolator $200_1$ without noise in the first reverse signal. The noise-free first reverse signal is bandpass-filtered and rectified, and becomes a DC signal. The DC signal is DC-amplified and fed to the controller 310. Since there is no noise in the first reverse signal, the DC-amplified signal will be smaller in strength than the reference DC signal due to the absence of noise, thus controller 310 controls the high-frequency switch 312 to output the first reverse signal. Then, the level of the first reverse signal is controlled by the attenuator 314.

On the contrary, when noise has been introduced into the first reverse signal, the noise-having first reverse signal is bandpass-filtered and rectified, and becomes a DC signal. The DC signal is DC-amplified and fed to the controller 310. Since the first reverse signal has noise, the DC-amplified signal will not be smaller in strength than the reference DC signal due to the existence of noise, thus controller 310 causes the output terminal of the high-frequency switch 312 to be connected to the matching resistor R so that the first reverse signal is not output.

In accordance with the present invention as described above, a noise-having reverse signal is isolated to prevent the noise from affecting other reverse signals.

While the present invention has been described in detail with reference to the specific embodiment, it is a mere exemplary application. Thus, it is to be clearly understood that many variations can be made by anyone skilled in the art within the scope and spirit of the present invention.

What is claimed is:

1. A noise-having reverse signal isolator in a cable television service system, comprising:
   a divider for dividing a reverse signal into a first signal and a second signal;
   a bandpass filter for passing only a signal in a noise-susceptible band from the first signal received from the divider;
   a detector for converting an output of the bandpass filter to a direct current (DC) signal;
   a DC amplifier for generating an amplified DC signal by DC-amplifying the DC signal output from the detector;
   a matching resistor having one end grounded and having a predetermined resistance value;
   a switch having a first input terminal connected to an output of said divider for receiving said second signal, a second input terminal connected to another end of said matching resistor and an output terminal, said switch selectively connecting one of the first and second input terminals to said output terminal; and
   a controller for determining whether noise exists in the reverse signal by comparing the amplified DC signal output from said DC amplifier with a reference DC signal and controlling said switch based on the determination.

2. The noise-having reverse signal isolator as set forth in claim 1, wherein said predetermined resistance value is 75 ohms.

3. The noise-having reverse signal isolator as set forth in claim 1, wherein said controller determines said reverse signal has noise when a value of said amplified DC signal is greater than a value of said reference DC signal and controls said switch to connect said output terminal to said matching resistor.

4. The noise-having reverse signal isolator as set forth in claim 1, wherein said controller determines said reverse signal has no noise when a value of said amplified DC signal is less than a value of said reference DC signal and controls said switch to connect said output terminal to said divider to output said second signal as said reverse signal.

5. The noise-having reverse signal isolator as set forth in claim 1, further comprising an input amplifier for amplifying said reverse signal and outputting an amplified reverse signal to said divider.

6. The noise-having reverse signal isolator as set forth in claim 1, further comprising an attenuator for controlling a level of a signal output from said output terminal of said switch.

7. The noise-having reverse signal isolator as set forth in claim 4, further comprising an attenuator for controlling a level of said second signal output from said output terminal of said switch.

8. The noise-having reverse signal isolator as set forth in claim 1, wherein said noise-susceptible band is 5–15 MHz.

9. A noise-having reverse signal isolator in a CATV-using service system, comprising:
   an amplifier for generating an amplified reverse signal by amplifying a reverse signal;
   a divider for dividing said amplified reverse signal into a first signal and a second signal;
   a bandpass filter for passing only a signal in a noise-susceptible band from the first signal received from the divider;

a detector for converting the output of the bandpass filter to a direct current (DC) signal;

a DC amplifier for generating an amplified DC signal DC-amplifying the DC signal output from the detector;

a resistor having one end connected to a ground terminal;

a high-frequency switch having a first input terminal connected to receive said second signal from an output of the divider, a second input terminal connected to another end of said resistor and an output terminal, said high-frequency switch selectively connecting one of the first and second input terminals to said output terminal;

a controller for determining whether noise exists in the reverse signal by comparing the amplified DC signal output from the DC amplifier with a reference DC signal and controlling said high-frequency switch based on a result of the determination; and an attenuator for controlling the output level of a signal output from said output terminal of said high-frequency switch.

10. The noise-having reverse signal isolator as set forth in claim 9, wherein said noise-susceptible band is 5–15 MHz.

11. The noise-having reverse signal isolator as set forth in claim 9, wherein said controller controls said switch to connect said output terminal to said matching resistor when a value of said amplified DC signal is greater than a value of said reference DC signal and.

12. The noise-having reverse signal isolator as set forth in claim 9, wherein said controller controls said switch to connect said output terminal to said divider to output said second signal as said reverse signal when a value of said amplified DC signal is less than a value of said reference DC signal and.

13. The noise-having reverse signal isolator as set forth in claim 9, wherein said noise-having reverse signal isolator forms one of a plurality of noise-having reverse signal isolators with each of said noise-having reverse signal isolators determining whether noise is introduced into a corresponding reverse signal to isolate the reverse signal having said noise, and outputting the reverse signals having an absence of said noise to a combiner for combining the reverse signals output from the plurality of the noise-having reverse signal isolators.

14. A reverse signal combining device in a CATV-using service system, comprising:

a plurality of noise isolators for determining whether noise is introduced into a plurality of reverse signals, isolating a corresponding reverse signal in the presence of noise, and outputting the reverse signals in the absence of noise, each said noise isolator comprising:

a divider for dividing said reverse signal into a first signal and a second signal;

a resistor having one end connected to a ground terminal; and a high-frequency switch having a first input terminal connected to receive said second signal from an output of the divider, a second input terminal connected to another end of said resistor and an output terminal, said high-frequency switch selectively connecting said first input terminal to said output terminal when no noise exists in said first signal and connecting said second input terminal to said output terminal when noise exists in the first signal; and a combiner for combining the outputs of the plurality of the noise isolators.

15. The reverse signal combining device as set forth in claim 14, where each of said noise isolators further comprises:

an amplifier for generating an amplified reverse signal by amplifying a reverse signal;

said divider dividing said amplified reverse signal into said first signal and said second signal;

a bandpass filter for passing only a signal in a noise-susceptible band from the first signal received from the divider;

a detector for converting the output of the bandpass filter to a direct current (DC) signal;

a DC amplifier for generating an amplified DC signal DC-amplifying the DC signal output from the detector;

a controller for determining whether noise exists in the reverse signal by comparing the amplified DC signal output from the DC amplifier with a reference DC signal and controlling said high-frequency switch based on a result of the determination; and an attenuator for controlling the output level of a signal output from said output terminal of said high-frequency switch.

16. The reverse signal combining device as set forth in claim 15, wherein said noise-susceptible band is 5–15 MHz.

17. The reverse signal combining device as set forth in claim 15, wherein said controller controls said switch to connect said output terminal to said matching resistor when a value of said amplified DC signal is greater than a value of said reference DC signal and.

18. The reverse signal combining device as set forth in claim 15, wherein said controller controls said switch to connect said output terminal to said divider to output said second signal as said reverse signal when a value of said amplified DC signal is less than a value of said reference DC signal and.

* * * * *